US007782890B2

(12) United States Patent
Herberger et al.

(10) Patent No.: US 7,782,890 B2
(45) Date of Patent: Aug. 24, 2010

(54) SYSTEM AND METHOD FOR DYNAMIC MOBILE COMMUNICATION

(75) Inventors: Tilman Herberger, Dresden (DE); Titus Tost, Dresden (DE)

(73) Assignee: Magix AG (DE)

( * ) Notice: Subject to any disclaimer, the term of this patent is extended or adjusted under 35 U.S.C. 154(b) by 914 days.

(21) Appl. No.: 11/615,550

(22) Filed: Dec. 22, 2006

(65) Prior Publication Data

US 2008/0153518 A1    Jun. 26, 2008

(51) Int. Cl.
    *H04J 3/26* (2006.01)
(52) U.S. Cl. ............... 370/432; 370/390; 455/518; 455/519
(58) Field of Classification Search ............ 370/315
    See application file for complete search history.

(56) References Cited

U.S. PATENT DOCUMENTS

| 5,740,366 | A  | * | 4/1998  | Mahany et al. ............ 709/227 |
| 6,664,891 | B2 |   | 12/2003 | Davies et al. |
| 6,674,995 | B1 |   | 1/2004  | Meyers et al. |
| 6,763,226 | B1 | * | 7/2004  | McZeal, Jr. ............. 455/90.2 |
| 2001/0053691 | A1 | * | 12/2001 | Harma ................... 455/419 |
| 2002/0065065 | A1 |   | 5/2002  | Lunsford |
| 2002/0065868 | A1 |   | 5/2002  | Lunsford et al. |
| 2002/0128030 | A1 |   | 9/2002  | Eiden et al. |
| 2002/0131445 | A1 |   | 9/2002  | Skubic et al. |
| 2002/0151320 | A1 |   | 10/2002 | Wasenius |
| 2002/0168992 | A1 |   | 11/2002 | Eiden et al. |
| 2003/0012219 | A1 |   | 1/2003  | Joo |
| 2003/0045311 | A1 |   | 3/2003  | Larikka |
| 2004/0082351 | A1 |   | 4/2004  | Westman |
| 2004/0203950 | A1 |   | 10/2004 | Chen |
| 2005/0059346 | A1 |   | 3/2005  | Gupta et al. |
| 2005/0063409 | A1 |   | 3/2005  | Oommen |
| 2005/0113123 | A1 |   | 5/2005  | Torvinen |
| 2005/0135286 | A1 |   | 6/2005  | Nurminen et al. |
| 2005/0136901 | A1 |   | 6/2005  | Jung et al. |
| 2005/0170856 | A1 |   | 8/2005  | Keyani et al. |
| 2005/0186970 | A1 |   | 8/2005  | Yates |
| 2005/0197061 | A1 |   | 9/2005  | Hundal |

FOREIGN PATENT DOCUMENTS

| FR | 2817691 | 6/2002 |
| GB | 2 391 135 A | 1/2004 |

* cited by examiner

*Primary Examiner*—Ajit Patel
(74) *Attorney, Agent, or Firm*—Fellers, Snider, Blankenship, Bailey & Tippens, P.C.; Terry L. Watt

(57) ABSTRACT

There is provided herein a system and method for dynamically creating and/or joining multi-user text communication groups, wherein the user is not restricted to the technical limitations of standard communications protocols and wherein the user is able to create and/or join this multi-user group without a need for elaborate installation or configuration steps. The system and method will primarily be intended for the market of mobile devices and the instant disclosure is generally directed to users who have modern mobile devices that feature support for the Bluetooth communication protocol or have support for Wi-Fi technology and that furthermore allow the user to use that communication protocol/technology for communications with other users.

7 Claims, 7 Drawing Sheets

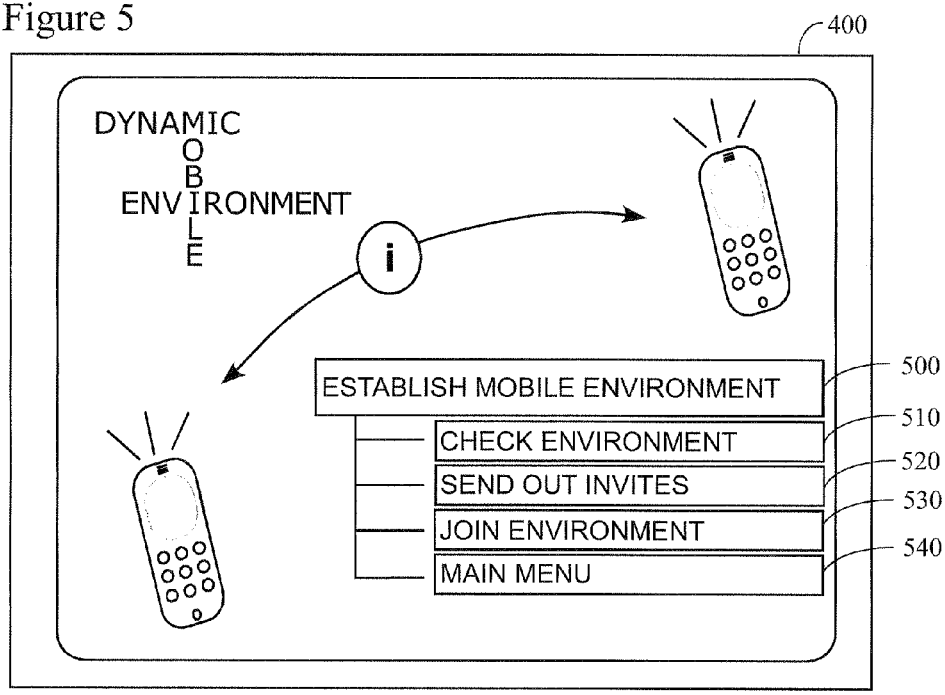
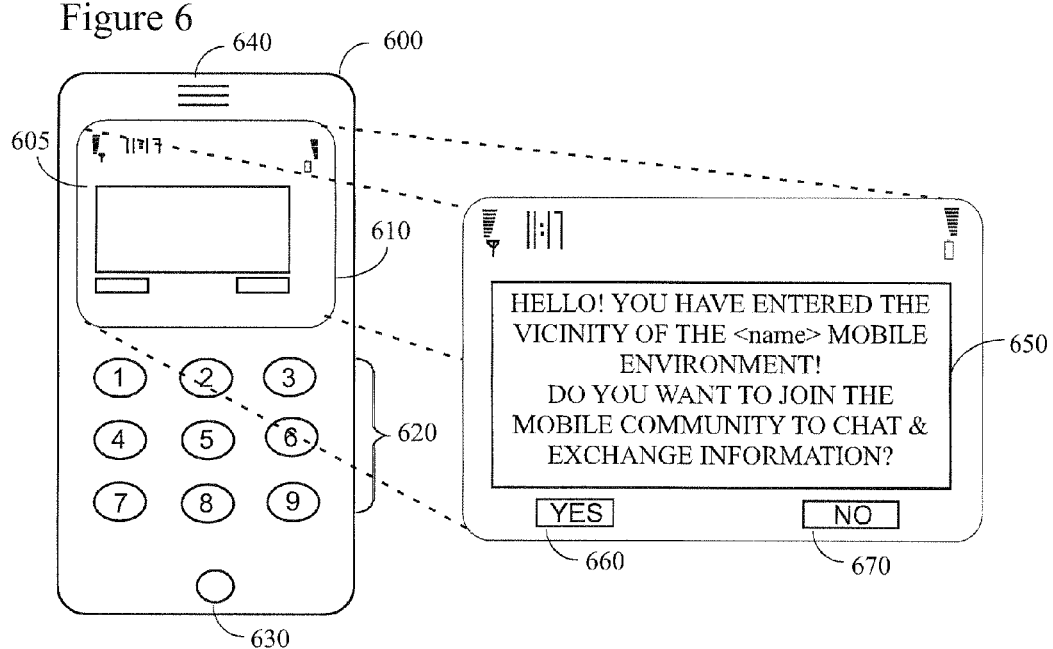

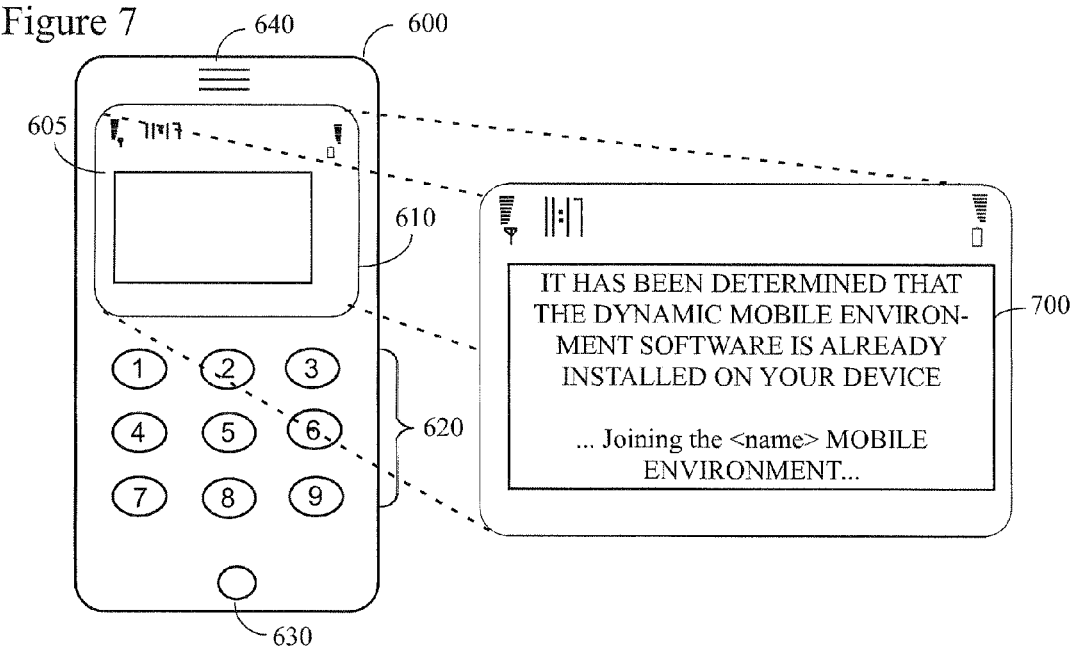
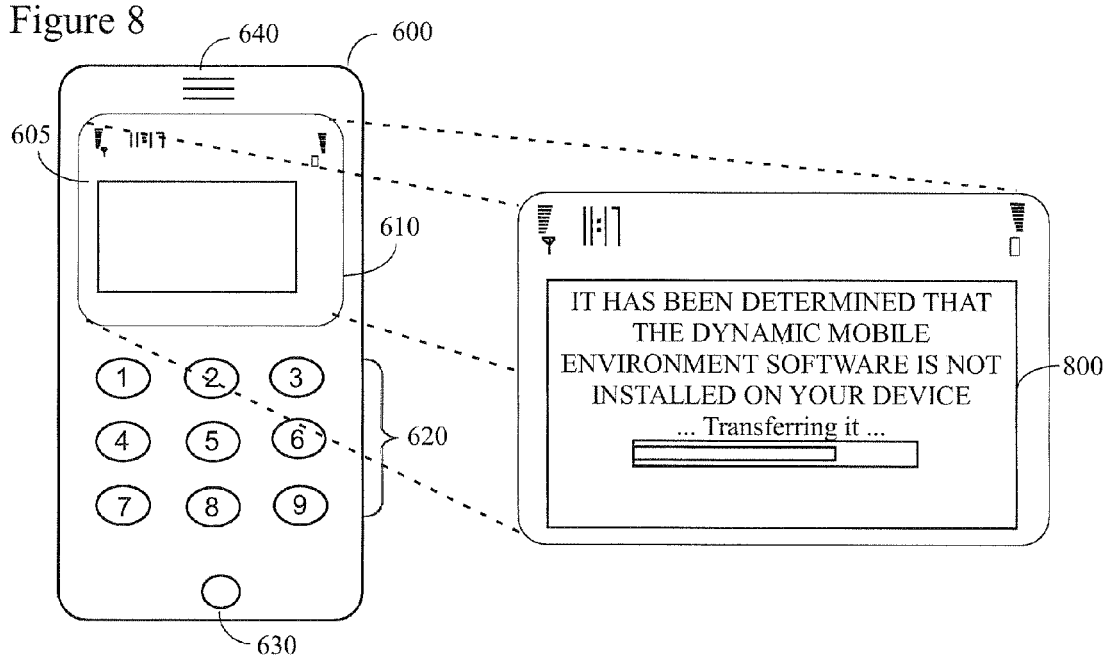

SYSTEM AND METHOD FOR DYNAMIC MOBILE COMMUNICATION

FIELD OF THE INVENTION

The present invention relates generally to the field of digital wireless communication and mobile devices. More particularly, but not by way of limitation, the present invention relates generally to a process which allows users of mobile devices to dynamically create or join mobile multi-user communities/groups.

BACKGROUND OF THE INVENTION

It is a truism that modern cell phones feature a multitude of features that expand on the traditional cell phone functionality. For example, today cell phone users are able to use their phones to connect to the Internet, manage meetings, appointments, and other aspects of their every day lives, listen to music and watch videos, etc. In essence the cell phone—which began as a single-function communicator—has grown into a fully functioning multimedia device. However the fundamental function of a cell phone remains communication. It should be noted that cell phones are also sometimes referred to as mobile phones, which in the proper meaning of the word indicates that the user of that phone is mobile, and is supposedly always available for anyone who might want to contact him or her.

The core functionality of mobile/cell phones has been basically the same since the first devices were made available to consumers. Although there has been a rapid expansion in the feature set of most cell phones, the core functionality has not seen a similar expansion. The reasons for the development discrepancy likely have to do with the fact that the core functionality is sufficient for most users and that there are not just that many ways of enhancing the person-to-person communication experience on a mobile device Arguably, the most important enhancement in the cell phone, at least as it relates to interpersonal communication, has been the development of the capability of sending short text messages from one phone to another.

Otherwise, the main improvements in communications have been largely concerned with connectivity. For example, communications protocols such as infrared and Bluetooth have become de facto requirements for all but the most inexpensive phones. In addition advances have been made in connectivity to the Internet (for example) and now it is routine for users to be able to access their e-mail and browse the web via their phones.

However, these improvements in connectivity, as welcome as they might be, do not expand on the one-to-one personal communication aspect of the phone. One thing that would be a leap forward in such communications would be the ability to quickly and easily assemble a multi-user communication session that is hardware independent and, further, does not require the user to purchase additional hardware. Although the prior art has provided multi-user communications in the form of, for example, conference calls—the present technology of conference calls is quite limiting to the user. For example, it is typically limited to a predetermined number of user connections (e.g., 5). Further, a start time must be communicated to each user so there is little opportunity for spontaneity. Further, adding more users to the session may be very difficult or impossible. Finally, the conference call will ultimately be limited to known users, i.e., those who are known to one of the participants and have been invited.

Additionally, exchanging short messages between users is a time-delayed communication mode that typically involves a one-to-one communication. Even though some software providers have offered solutions that allow a user to send one short message to multiple participants, such is not the same as real time voice communication between these same users. Of course, such group messaging is a time-delayed communication mode too, in which at least one participant is always in a waiting position. Thus, this communication option also offers little in the way of spontaneity or flexibility to the user.

As was mentioned previously, over the last few years several attempts have been made to enhance the communication options available to owners of mobile devices, for example infrared and Bluetooth have been added but they have been used so far mostly for communication with other devices, i.e. for data transfer—not for direct communication between users.

Those of ordinary skill in the art will recognize that infrared is limited to communications over a relative short line-of-sight distance between potential communication partners. As a consequence, the infrared protocol has typically been implemented as a simple data exchange protocol which is useful, for example, in synchronizing data between a mobile phone and a personal computer.

On the other hand, the Bluetooth protocol provides for the creation of networks, so called piconets, in which up to 255 participants can be combined, of which only 8 participants can be active simultaneously, these 8 participants consist of one so called "master" device and seven so-called "slave" or secondary devices. The master device controls the communication and assigns so-called "sendslots" to participants. Additionally, communications within a piconet are based on the client server principle, which imposes the restriction that the master (server) is needed for on-going communications. Thus, when a master device looses the connection the piconet ceases to exist until a new master is selected and re-establishes the piconet by starting the creation process at the beginning. Although a Bluetooth device can be registered in multiple piconets, it can only be registered as master in one piconet.

Additionally, those of ordinary skill in the art will recognize that the term scatternet is often used to refer to a combination of up to 10 piconets in which each piconet is associated with a different identification frequency. However, the technical specifications of the Bluetooth communication protocol limit the functionality of that communication option. For example, those of ordinary skill in the art will recognize that a piconet can accommodate a maximum of 8 active participants. Further, a piconet will collapse if the server (master) looses the connection.

Others have sought, with varying degrees of success, to deliver enhanced communication functionality despite the limitations of the Bluetooth protocol. For example, U.S. Pat. No. 6,674,995 teaches the creation of a virtual ball game that utilizes data that is passed between participants via Bluetooth, thereby delivering to them the illusion that they are playing a ball game. As another example, U.S. patent application No. 20020151320 describes a method of giving users in a user community additional functionality when using a software package in a community environment. That is, certain functions are provided to the users depending on the number of participants, with higher user numbers being associated with the unlocking of additional program functionality. However, these sorts of approaches are still fundamentally limited by the nature of the Bluetooth protocol.

As an example of an alternative approach to the use of Bluetooth, consider U.S. patent application 2005/0063409 that teaches a method for allowing users to communicate across several scatternets. However, this invention utilizes multiple interconnected servers and is not suitable for users that wish to quickly arrange and participate in an ad hoc communications group.

None of the prior art communication options, however, deliver a flexible way of communicating with an arbitrary number of individual users. In each case either the users are restricted by the technical limitations of the Bluetooth standard or the communication options necessary to create a group chat are too involved for the average user to accomplish. Note that for purposes of the instant disclosure, the term enhancement of the communication options will be taken to refer to any approach that allows a user to communicate with a mobile device in addition to the already existing communication options.

Thus what is needed is a method that gives the user of a cell phone or users of mobile devices the ability to create multi-user communications on that device without a need for elaborate equipment configurations, planning, or installation and which is not bound by the technical limitations of a specific communication protocol. Preferably the method will extend an invitation to others to join a communications group and will automatically provide the appropriate software for use by new users who do not already have it. Preferably the method will use a commonly available wireless protocol such as Bluetooth or Wi-Fi.

Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for dynamically creating and/or joining multi-user text communication groups, wherein the users are not restricted to the technical limitations of standard communications protocols and wherein the user is able to create and/or join this multi-user group without a need for elaborate installation or configuration steps. The system and method will primarily be intended for the cell phone market and the instant disclosure is generally directed to modern cell phones and mobile devices which feature support for the Bluetooth communication protocol and/or the Wi-Fi communication technology and that furthermore allows the user to use that communication protocol/technology for enhanced text communication with other users.

In brief, the instant invention enables a user to dynamically create multi-user communication groups for the purpose of text communication or data transfer with other users of mobile communication devices. According to a preferred aspect of the instant invention, users will be allowed to create a multi-user communication group without the limitations of existing communication protocols and without the involved configuration steps needed by some communication technologies. The multi-user communication group will preferably be created via an invite-and-join principle, wherein specific invitations are transmitted by an initiating mobile device and the receiving mobile devices will be able to join the multi-user communication group by accepting the invitation. Additionally the instant invention will preferably feature a means for automatically supplying the software needed for participating in the communication group to new joiners, if they do not already have the appropriate software on their cell phone or other mobile communications device.

According to one aspect of the instant invention, a preferred first step will be to install appropriate communication software on a user's mobile device. Preferably this software will be designed to send and receive information using the mobile devices Bluetooth capability or Wi-Fi capability. The software will make it possible for a mobile communications device to join in a group according to the instant invention. In a preferred variation, a user will initiate the creation of a multi-user communication group by setting the software into an invitation mode, wherein the mobile device will continuously broadcast invitations via Bluetooth or Wi-Fi. These invitations will be transmitted according to the general range restrictions of the chosen wireless technology.

As a next preferred step, the electronic invitations will be received by one or more potential communication candidates, e.g., mobile device users with an activated wireless capability that are within signal range of the initiating mobile device. In a preferred arrangement, the invitation will inform other users that an offer has been extended to participate in a multi-user communication group for the purpose of exchanging text information or data. Additionally, in a preferred arrangement the offer to join will carry with it an ability to decline joining.

If a candidate accepts the invitation, the instant invention will preferably automatically transmit a software package to the joining candidate, wherein the software that is transmitted will preferably contain the programming and data necessary for the candidate to join a multi-user communication group. Preferably, at any time during joining process, the user will be given an option to retract the accepted invitation and decline to join. In another preferred embodiment, the communication recipient will send an acceptance message back to the initiator. The acceptance message will preferably contain data about the recipient, for example information such as whether or not that user already has the necessary software resident within his or her device, etc. In addition, identification information pertaining to the invited/joining candidate will also be preferably transmitted back to the initiator. In one preferred embodiment, the candidate will transmit the acceptance information back to the initiator along with an indicator (e.g., a data flag) that communicates the fact to the initiator's mobile device that the necessary software is already available on the candidate's mobile device. In the event that the invitee's mobile device does not contain the necessary software, the instant invention proceeds to the next step.

In a next preferred step, the appropriate software will be transmitted to the responding invitee if it is needed. As was mentioned previously, if the software is already in place and it is the latest (or an acceptable) version (revision) number, it will preferably not be retransmitted. The software will then preferably be installed automatically on the mobile device of each responding candidate and all necessary settings and configuration options that are needed to join the group will preferably similarly be automatically configured in the installed software. The information for these settings and configuration options will preferably be transmitted along with the software after the candidate accepts the invitation. The installed software will preferably automatically utilize the data it will have been provided in order to automatically connect the candidate user with a communications group that has been initiated by the inviter. However, in some preferred arrangements the user may be given the option of selecting a group to join from a list of available groups.

As a next preferred step the candidate user will automatically connect to the multi-user communication group with the help of the installed software and the accompanying identification information. After the invitee has been connected to the group, the invitee will preferably be able to exchange information or data with each member of that group. A preferred usage for the instant invention is to enable a realtime chat-program wherein the members of the group can communicate with each other by using their cell phone keypads to type messages and send them in realtime to each of the other members of the group. Additionally, in some preferred variations it will also be possible to send small documents, images or music files from one user to another or simultaneously to every user in the group, depending on the wishes of the sending user.

In one preferred embodiment, as each invitee joins the communications group that user's mobile device will automatically be set to an invite mode, which means that the device will thereafter periodically transmit invitations to others inviting them to join the group. This will typically result in further invitations being accepted, as users that are not currently in the group pass nearby, receive the invitation, and elect to join. By using this approach it will be possible to accelerate the creation and expansion of the communication group. Note that in this embodiment, there is no designated "master" device appointed for the entire group.

It should be clear that an approach such as this would be an obvious benefit to users of mobile devices and would additionally represent a tremendous enhancement in the communication offerings provided by modern mobile devices. By means of the use of the instant invention, users will be able to quickly and easily form multi-user communication groups that provide for the exchange of data and information. Of course, and as has been discussed previously, such groups will be formed without the restrictions normally imposed by the Bluetooth protocol and without the need for separate communication servers through which the users would otherwise have to connect before communicating with each other. Additionally, the communication groups formed according to the instant invention will not be subject to collapse if the initiating device would loose the connection to the group. Preferably, each step of the instant invention will be carried out automatically without any need for the involvement of the specific user of a mobile device.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which:

FIG. 5 depicts a preferred graphical user interface at a second phase of the instant invention.

FIG. 6 depicts a preferred graphical user interface of a mobile device after reception of the invitation.

FIG. 7 depicts a preferred graphical user interface of the instant invention, said display indicating the detection of the necessary software on the participant's mobile device.

FIG. 8 illustrates a graphical user interface suitable for use with the instant invention as it preferably appears during the transmission of the necessary software to a participant's mobile device.

DESCRIPTION OF THE PREFERRED EMBODIMENTS

Figure 1:
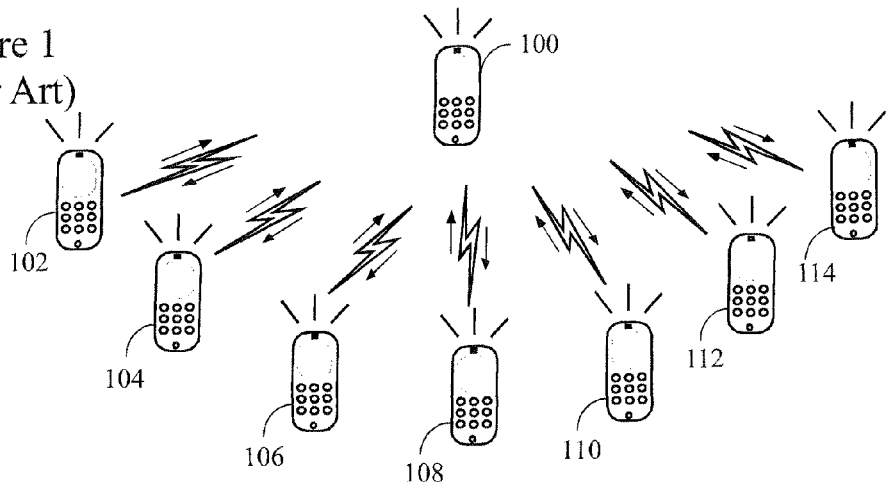
FIG. 1 illustrates a Bluetooth piconet consisting of mobile devices according to the prior art.

Referring now to the drawings, wherein like reference numerals indicate the same parts throughout the several views, there is provided a preferred system and method for dynamically creating or joining mobile multi-user text communication groups which do not suffer from the disadvantages of the prior art.

By way of general explanation and in accord with the preferred embodiment, it is to be understood that when the phrase "dynamically creating or joining mobile multi-user communications groups" is used herein that usage will preferably be interpreted as meaning creating or joining multi-user text communication-groups on mobile devices that feature support for the Bluetooth communication protocol or Wi-Fi, wherein the group may comprise an arbitrary number of available devices and, more particularly, may consist of more devices than would be possible under a prior art implementation under the Bluetooth protocol. According to the preferred embodiment, the multi-user group will be initiated by one user through the use of software designed for that purpose and that has been installed on the user's mobile device. The instant invention will preferably be carried out on a Bluetooth equipped communications device. The steps of the instant invention that culminate in the creation of the multi-user group can be split into a two stage process, with one stage being carried out on a initiators mobile device and the second stage being carried out on the mobile devices of the participants/invitees. The instant invention preferably guides each member and potential group member through a series of preparatory steps, thereby simplifying the process of creating/joining the multi-user communications group.

For purposes of the instant embodiment it should be understood that the instant invention preferably seeks to enable a group of users to dynamically and easily create a user community, wherein each of the users can participate in two-way text communications without any particular numerical constraint on the number of participants and without requiring additional hardware or complicated setup/configuration steps that might be beyond the ability of the average user. The creation of the multi-user communications group is preferably carried out via an invitation system, wherein the initiating user sends out digital invitations to each device in the vicinity of the users mobile device. Preferably accompanying the invitation will be setup information that will be needed by the invitee if he or she elects to join in. As a preferred step in achieving this goal, the instant invention automatically transfers necessary communication software to the mobile device of a user who elects to join the communications group if the participant does not already have it. Preferably, the software that has been transmitted to the new user will not require any input on the part of the user but, instead, will handle the connection details automatically. Additional details will be given in the paragraphs that follow.

Figure 2:
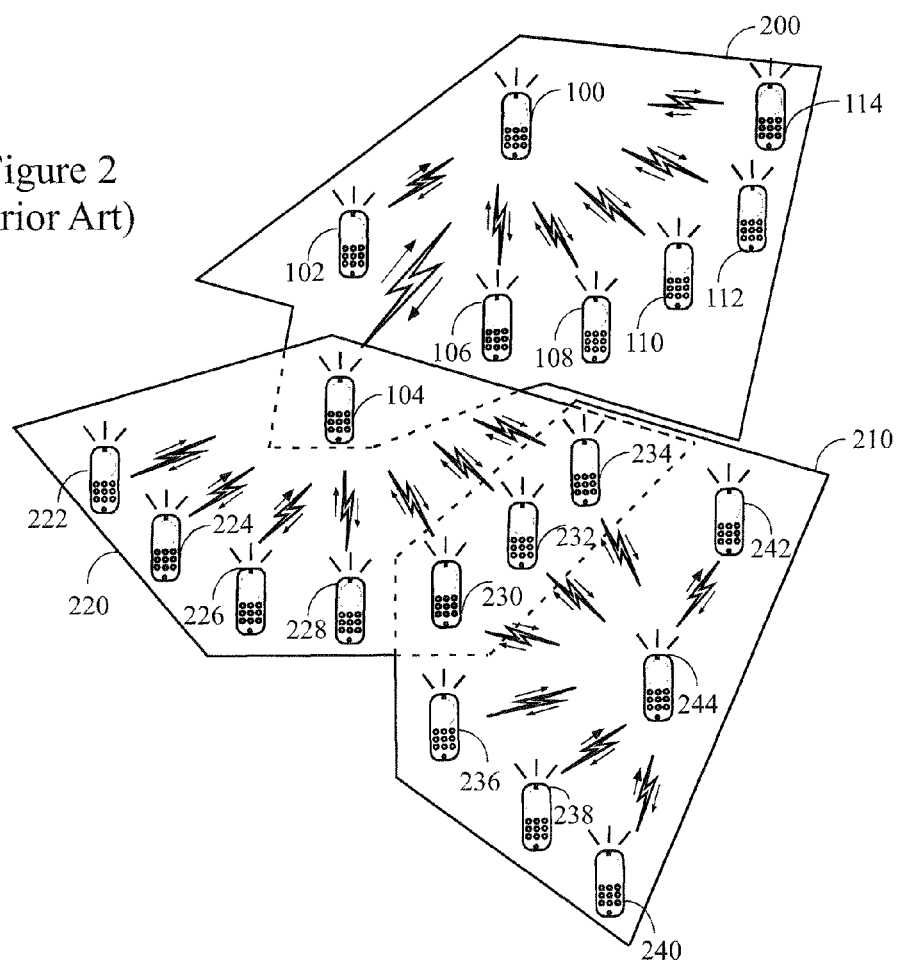
FIG. 2 illustrates a Bluetooth scatternet comprising of a plurality of piconets according to the prior art.

FIGS. 1 and 2 illustrate some prior art communication options that have been used heretofore on mobile devices that can transmit information via Bluetooth. These figures illustrate some of the problems with existing technology that will be overcome by the instant invention.

Turning first to FIG. 1, this figure contains an illustration of a prior art communications option for use on mobile devices that are equipped with Bluetooth. The prior art means of establishing a communications group is based on a loosely connected network of Bluetooth devices. This loosely connected network is often referred to as a piconet. Those of ordinary skill in the art will understand that such a piconet is controlled by at least one initiating or master device 100 which handles the communication between all of the so-called slave (or secondary) devices 102, 104, 106, 108, 110, 112, 114. A piconet is limited to eight active participating devices and is also specifically designed around the master-slave principle, wherein the communication of the group stops when the connection between the master and any secondary device terminates.

FIG. 2 illustrates how several Bluetooth piconets could potentially be combined to form a scatternet, a scatternet being a loosely connected collection of piconets, wherein up to 10 piconets can be combined. FIG. 2 illustrates three piconets 200, 210, and 220 which are interconnected to form a scatternet. However, because the scatternet is just a collection of independent piconets, the same limitations and regulations apply to the scatternet as it does to the individual piconets. That is, this communications group is similarly dependent on the continued participation of the initiating/master device, with group communications ending if there is an interruption in the participation by the master. Additionally, this configuration is limited by the fact that a Bluetooth device can be registered in more than one piconet but it can only be registered as master in one.

Figure 3:
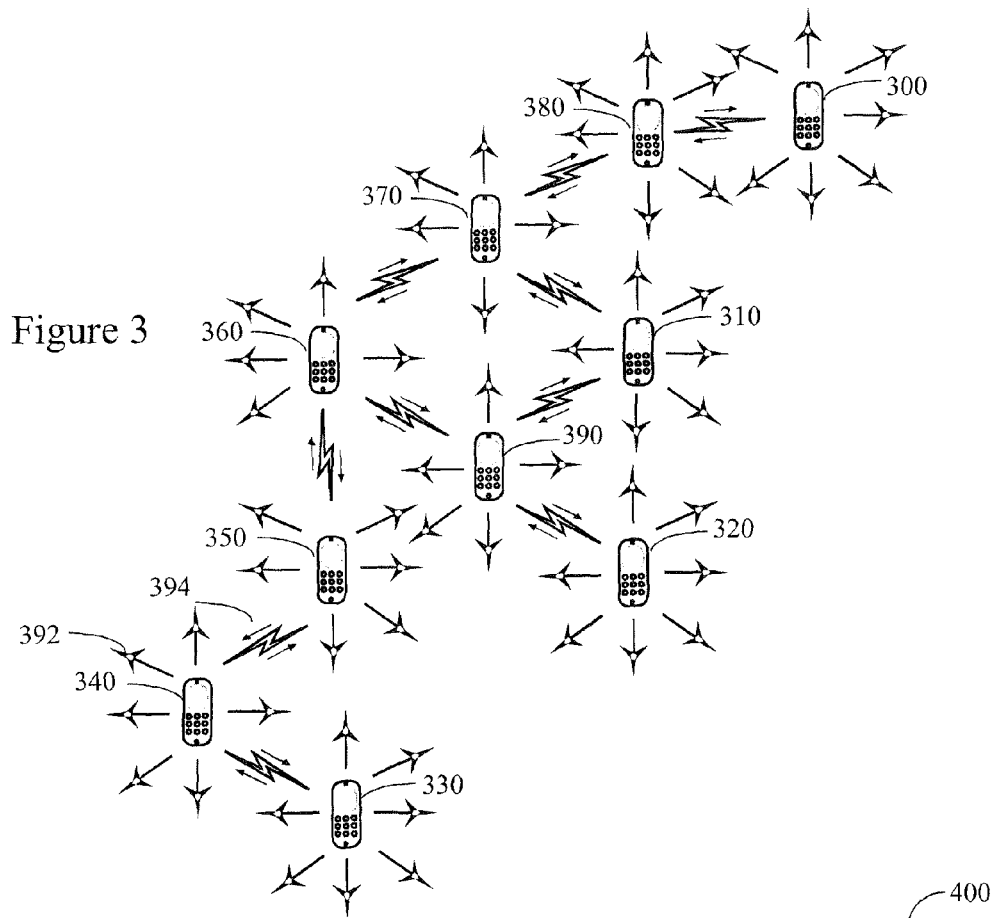
FIG. 3 illustrates a preferred network scheme according to the instant invention.

Turning next to a discussion of the instant invention, FIG. 3 illustrates a basic principle of the communication and connection between devices of the multi-user communications group according to the instant invention. According to a preferred embodiment, a plurality of mobile devices 300, 310, 320, 330, 340, 350, 360, 370, 380 and 390 with support for Bluetooth or Wi-Fi are illustrated as being members of a multi-user communication group according to the instant invention. The mobile device that initiated the creation of the group could be any one of the illustrated mobile devices. As is generally indicated in this figure, in the preferred embodiment the instant invention does not operate with a master device. Each device is an equal member of the group. As a consequence, the communication between devices is not interrupted if one member leaves the group.

In addition, FIG. 3 generally illustrates the communication principle that is used to create the multi-user group. In this illustration, device 340 is pictured as sending out data 392 that is intended to be received within the coverage area that is typical for Bluetooth or Wi-Fi devices. In this particular example, the data that is transmitted is an invitation to join the multi-user communications group. Then, when a new participant 350 joins the group in response to the electronic invitation, a connection 394 between the initiating and invited devices is established and both devices become members of the multi-user communication group, which might consist of as few as two members. In addition, the mobile device 350 of the newly added member will next optionally (depending on specific software settings which will be explained later in more detail) automatically begin to send out an electronic invitation to join the group. Preferably, the transmitted invitation will be receivable over the maximum area that the Bluetooth communications protocol or Wi-Fi technology provides for. Of course, users who accept the invitation will then potentially become transmitters of the same invitation, thereby potentially expanding the group count further. In the preferred embodiment, the invitation will be receivable by any device within the listening range of a conventional Bluetooth transmitter or Wi-Fi ready device.

The known limitations of the Bluetooth (and similar) communications protocol are overcome by the instant invention by, in simplest terms, shunning the client-server model in favor of a more peer-to-peer type model. Said another way, according to a preferred aspect of the instant invention each participating device stands alone and there will be no master/servant connection between participating devices, so that the traditional server-client model is avoided. The communication environment is a virtual one, wherein communications between the users are controlled and maintained by the software resident within each device and through the intelligent use of the selected communication protocol. Communication between individual members of the communication group will preferably be immediately sent in near real time at the moment a user finishes composing a message or at the moment when the user initiates the file transfer. However the transmission of text messages or a computer file will preferably be carried out within a connection that is created at the time the user indicates a desire to send the text message/file.

The software which manages the functionality of the software environment and which will be present on every device that is a member of the communications group will preferably send out notices at regular intervals (e.g., every 2 seconds), wherein the notices preferably will contain information such as the ID (device name) of the originating device, the user-/nickname of the user of the device, and the name of the communications environment. These notices can be broadcast via wireless along with the invitations or broadcast separately from them.

The name of the communications environment will preferably be defined by the initiator when starting the group. Through the use of the notices (after receipt of same), the software on each device will be able to keep track of the current membership of its group. The communications environment is, thus, not a fixed group—it is a virtual group, wherein the name of the virtual group is preferably chosen by the initiating device and/or its user.

Every device that is part of the virtual group will preferably have a unique ID and each device that participates will receive the group name and store it internally. Further, the resident/controlling program will preferably receive the notices transmitted by each of the member devices and will store the information transmitted therein. When a user sends a text message to the communication group, the program will preferably compress the text in advance of transmitting it according to methods well known to those of ordinary skill in the art prior. On the receiving end, the phone of any group member within broadcast range will be able to determine through the use of the identifying information provided (e.g., communications group name and ID) whether or not the transmitted message is intended for that particular device. When sending data files, the program will preferably establish a connection with only the target device by using the address information discussed previously and send the file directly to the target device. By using this approach the instant invention does not establish a fixed connection between the members, therewith the number of members is not limited and the system does not function within the limits of the client-server principle and additionally there is no theoretical upper limit on the number of the potential members, as the connections between the members of the communication group are created dynamically and on-demand.

Figure 4:
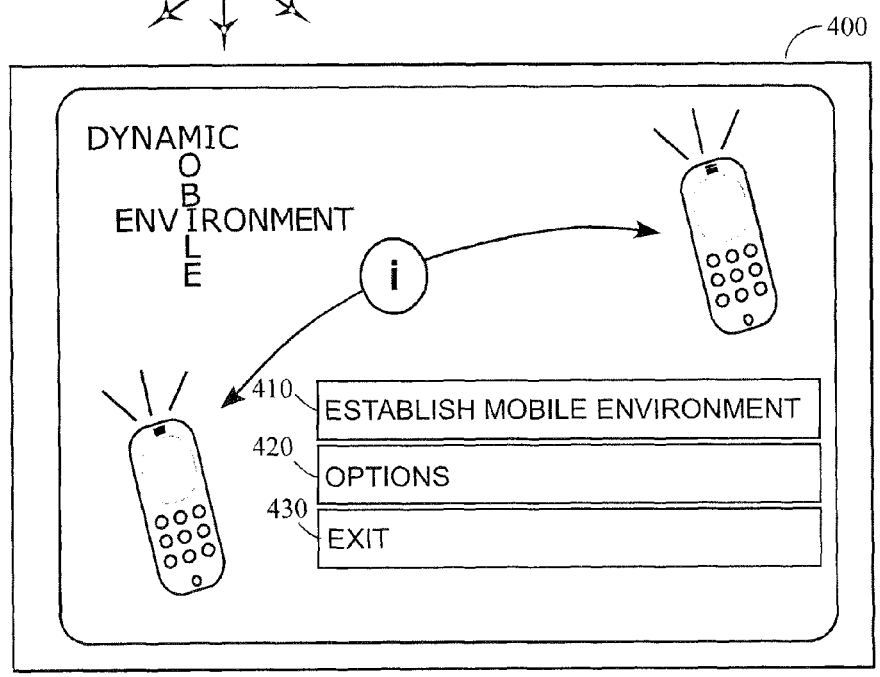
FIG. 4 depicts a preferred graphical user interface of the instant invention at a first phase.

Turning next to FIG. 4, in a preferred arrangement of the instant invention a user will be presented with a graphical user interface of the general form of the mobile device screen display 400 illustrated in this figure. The user will preferably be provided with at least three menu options, each such option allowing the user to initiate one of the functions of the instant invention. As is indicated in this figure, preferably the user will have at least the option of establishing a mobile environment 410, although it is likely that other functions will be provided as well (e.g., modifying program options 420, exiting the program 430, etc.). Preferably, the "Options" menu item 420 will at least allow the user to specify parameter settings that are useful or needed for the configuration of the instant invention. As an example, in the preferred embodiment the user will be able to select a nickname (potentially a pseudonym) that will be used during the communication with the other members of the group. In other preferred variations, the user will be able to edit the standard invitation message that will be sent out from the mobile device, or the user might be able to select the group name. Selection of menu option 410 will preferably initiate one of the key functions of the instant invention, i.e., the user will have indicated a desire to establish a communications group. Of course, interaction with the graphical user interface will preferably be carried out by way of the device (e.g., cell phone) keypad, soft (e.g., screen-drawn) and hard function keys, and/or other input mechanisms (e.g., track balls, joy sticks, touch screens, etc.). Those of ordinary skill in the art will recognize that interaction with the user can also be carried out—via any number of different methods and through the use of attached (or networked) peripherals or other devices well known to those of ordinary skill in the art.

Turning next to FIG. 5, this figure illustrates how the screen of FIG. 4 might appear after the user has selected the group creation option 410. In the preferred arrangement, the user will be presented with a display screen 400 on which information that monitors the progress of the connection process is displayed. For example, in this figure menu item 500 indicates that the submenu items below it (i.e., items 510 through 540) are generally concerned with the establishment or testing of the group communications settings. In some preferred embodiments the user will be able to perform a "check of the mobile environment" (menu item 510), wherein the user's mobile device will initiate a scan of the area surrounding the user with the goal of detecting preexisting communication groups. Additionally, the user will preferably be able to initiate a "send out invites" option 520, wherein the instant invention will continuously transmit invitations. These invitations are messages that are broadcast via Bluetooth or Wi-Fi and are potentially receivable by any other Bluetooth or Wi-Fi device in the vicinity. A specific example of such an invitation is provided in FIG. 6 which is explained in greater detail later.

In some preferred embodiments, the user might also be able to join an existing communication group 530, assuming that one or more of such groups is within reception rage. Assuming that such is the case, the instant invention will preferably then display the identifying information associated with any such detected communication groups to the user and the user will be able to select from among them. As a last preferred option, the user will be permitted to return to the main menu 540.

FIG. 6 illustrates in greater detail a screen display that might be presented to a user who approaches a communication group created according to the instant invention. As is generally indicated in FIG. 6, the instant invention will preferably utilize the graphic display of the user's mobile device 600 to communicate information to the user about the status of the communications group. Such a mobile device 600 will preferably have some amount of internal program memory and data storage (e.g. computer RAM) of that sort that is normally supplied with such units. Additionally, it is anticipated that the mobile device 600 will utilize a speaker 640 and a microphone 630. According to a preferred embodiment, and as is generally indicated in FIG. 6, a mobile device carrying out the instant invention will contain software resident therein with menu choices 650 that are displayed to the user via the mobile device display 610. As is indicated in FIG. 6, in a preferred embodiment a user will interact with the instant invention by way of the graphical display 610 of the mobile device and additionally with the use of the standard telephone keypad 620.

FIG. 6 displays a preferred representation of the invitation message 650 that will be presented to a mobile device user when the user enters the vicinity of the initiating user. Preferably, and as has been discussed previously, the initiating user's cell phone will periodically transmit invitations for others to join the group. As is indicated in this figure, preferably, the user will be informed via an on-screen prompt or an audible alarm that he or she entered the vicinity of an existing multi-user communication group. Preferably the user will be given the option of joining (or not) the group, with the user's wishes being communicated to the mobile device 600 by interaction with any of the input mechanisms (e.g., keypad 620, soft keys 660/670, etc.). Preferably, the cell phone owner will be presented with the option to join 660 or not (menu item 670).

Turning next to FIGS. 7 and 8, these figures contain some exemplary messages of the sort that will preferably be presented to the user of the instant invention if he or she elected to join the communication group according to the methods taught herein. As is generally indicated by the content of the user message 700 in FIG. 7, preferably the user's mobile device will automatically initiate a search of the memory (or other storage medium) of that device to see if the necessary communications software has been installed. If the instant invention detects the presence of the software—and if it is the correct or an acceptable version—the user will preferably be presented with a message 700 informing the user of that fact and starting the connection process. The establishment of a connection will preferably be carried out via a wireless communications protocol such as Bluetooth or Wi-Fi. Of course, the specifics of such connections are known to someone with ordinary skill in the art and shall therefore not be explained in more detail here.

If the instant invention detects that the necessary software is missing from the potential participant's mobile device, a notification message 800 will preferably be displayed to the potential participant, informing him or her that software needed to connect and use the functions of the multi-user communication group will be transferred to that device. To accomplish this transmission, the instant invention will preferably establish a connection between the initiator's and the invitee's mobile devices and a software package will then be wirelessly transmitted to the invitee's device. This step will preferably be carried out without notification to the potential participant.

Figure 9:
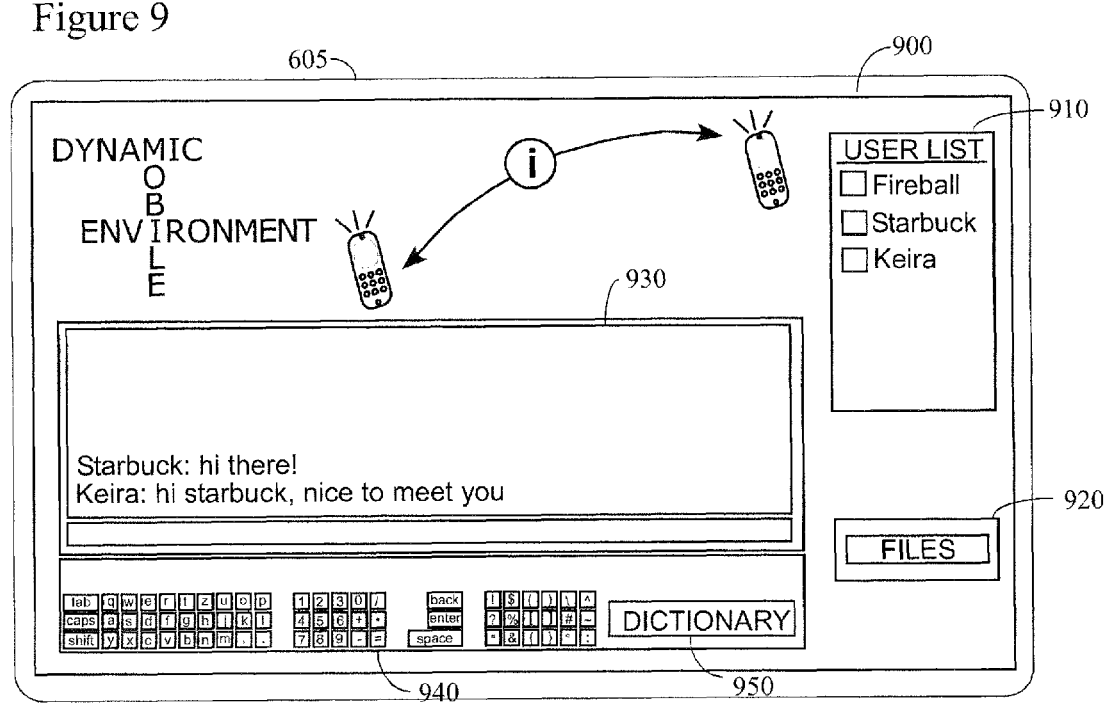
FIG. 9 depicts a graphical user interface of the instant invention which illustrates some preferred communications functionality of the software.

Turning next to FIG. 9, this figure illustrates how the preferred graphical user interface of the instant invention might appear on a mobile device after its user has elected to join the communication group and the mobile device of the participant has completed the joining process. In a preferred embodiment, the user will be presented with an application screen 900 containing program elements that are designed to help the user communicate with other members group. As an example, preferably a user list 910 will be presented to the user, wherein the nicknames of the current members of the group will be displayed. If the user wishes to send files to another user, he or she will be able to activate the files 920 button, after which a file browser will preferably be displayed so that the user can complete the file selection process. Additionally and preferably, the largest portion of the graphical user interface window 900 will be occupied by the chat window 930 and a software means 940 for helping the user communicate with the other group members. That is, preferably a portion of the chat window will contain a region where the user can read the typed group conversation and a section where the user can insert his or her text in order to participate in the chat session.

According to a preferred embodiment, the user will be able to interact with this chat window in several different ways. For example, it might be possible for the user to insert the text that he or she wants to contribute to the conversation via the buttons 620 of the mobile device as has traditionally been done when a user authors a short message. Additionally, in order to make text entry more efficient, the instant invention preferably utilizes a software solution 940 that will be added to the general chat window 930 and which presents a graphical representation of a conventional keyboard and preferably includes special characters and numbers.

By way of explanation and in accord with the embodiment of FIG. 9, when a user desires to input text, he or she will preferably navigate to the alphabet selection field 940 of the preferred graphic display using function keys, joystick/mouse (if available), touch screen, etc. In this fashion, it is possible for a user to enter text information quickly and accurately. Additionally, and to further ease the process of participating in the conversation, the instant invention preferably utilizes a dictionary which will automatically complete words that have been started by the user. The screen representation of the dictionary function is field 950 in FIG. 9. Additionally, in a preferred embodiment the user will be able to define abbreviations for commonly used words and have those entered into the dictionary by way of selection field 950. Additionally the preferred dictionary will include a learning algorithm which will automatically add to the user's dictionary every full word that the user types during a conversation session.

The workings of the software shall now be described in greater detail. As an initial matter, it will be assumed that the necessary communications software is available on every device that is a member of the communications environment. Preferably, the software will assign IDs for each device, wherein the ID might contain the user-/nickname and/or the hardware number of the device.

When the user indicates a desire to take part in the communications environment, the software will preferably continuously transmit notices (which could be combined with transmission of the invitations), wherein these notices broadcast the device ID and/or the user-/nickname and the name of the communications group of which the user is currently a member. By receiving such notices from other devices it is possible for the software to dynamically update sections of the software, for example the user-list of the chat-graphical user interface.

The user of the instant invention preferably interacts only with the software GUI, writes text messages, sends out files etc. The internal workings of the software are preferably kept hidden from the user. Preferably, the software will periodically (e.g., about every 2 seconds) send notices ("pings") containing ID, username and the group name of the communications group. Upon receipt of such a "ping," the software on a receiving device will preferably register the username in the user list of the chat-GUI and keep it there. Also and preferably, the resident software will store the received information so that at a later time the information can be accessed much faster.

When sending a text message, the software will preferably compress it and the user ID and user-/nickname, the name of the communications group from the source devices, etc., before dispatching the compressed information to all members stored in the user list of the current communications group. Further, in some preferred embodiments only those participating devices that have been heard from recently (e.g., from which the latest ping is not older than a specific value, e.g., 15 seconds) will be slated to receive the transmission.

Preferably, the software then simultaneously connects to each individual device (or, in some embodiments, sequentially so-connects) and transfers the text information to the participating devices. Upon receipt of such information, the software in the recipient's device will preferably read the ID and the user-/nickname of the originating device, together with the name of the communication group to which the text message is associated. Next, the software will preferably decompress the text information and will display it in the GUI, next to the user-/nickname. A file transfer will be executed in a similar manner, in that the file, the ID, and user-/nickname plus name of the communications group will preferably be transmitted and, upon its receipt, the software will read the ID and user-/nickname, and store the file and its associated information in a folder named, for example, after the ID or user-/nickname. The user will then preferably be informed of a successful transfer via, for example the printing of a notice in the chat-GUI region. That being said, those of ordinary skill in the art will recognize that notification might be communicated to the user in many ways (including notice given via the use of textual and/or audio signals).

Figure 10:
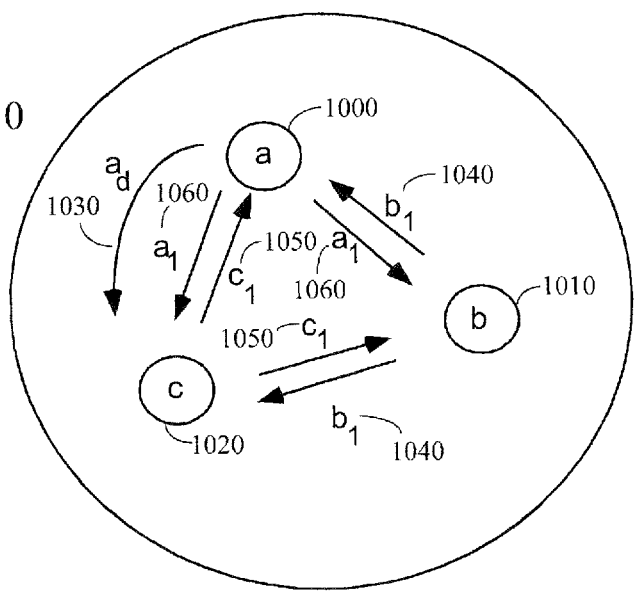
FIG. 10 contains a preferred depiction of the information transfer according to the instant invention.

Turning next to FIG. 10, this figure illustrates an example communication configuration according to the instant invention. Displayed in this figure are three participants of a multi-user communication group 1000, 1010 and 1020. The arrows in this figure illustrate a preferred flow of information between the participants. According to the instant embodiment, when a participant 1000 sends a text message out to the group, the instant invention preferably automatically sends this same message 1060 (a1) to both of the other group members 1010 and 1020 simultaneously, thereby making certain that the information arrives at both members' cell phones at approximately the same time. The same sort of transfer will preferably take place when the other members 1010 and 1020 send out their own messages to the group. In this case, messages 1040 and 1050 will preferably be sent out simultaneously to the other members of the group when members 1010 and 1020 take part in the conversation of the communication group (e.g., member 1010 sends out message $b_1$ and member 1020 sends out message $c_1$). In addition to the distribution of the message information to other members in the communication group, the users will preferably have an option to also send data or files to all or a single participant. If this transmission is to be to a single participant, this will preferably be accomplished by, first, choosing a participant from the user list (FIG. 9—900), next by activating the files menu option 920, and, finally, by selecting the data file or files that the user wants to transmit to another group member. For example, in FIG. 10, member 1000 is sending a data file to member 1020. The instant invention preferably automatically establishes a separate connection 1030 between the transmitting and receiving members and transmits the selected data file from member 1000 to member 1020 using information found in the user list.

Figure 11:
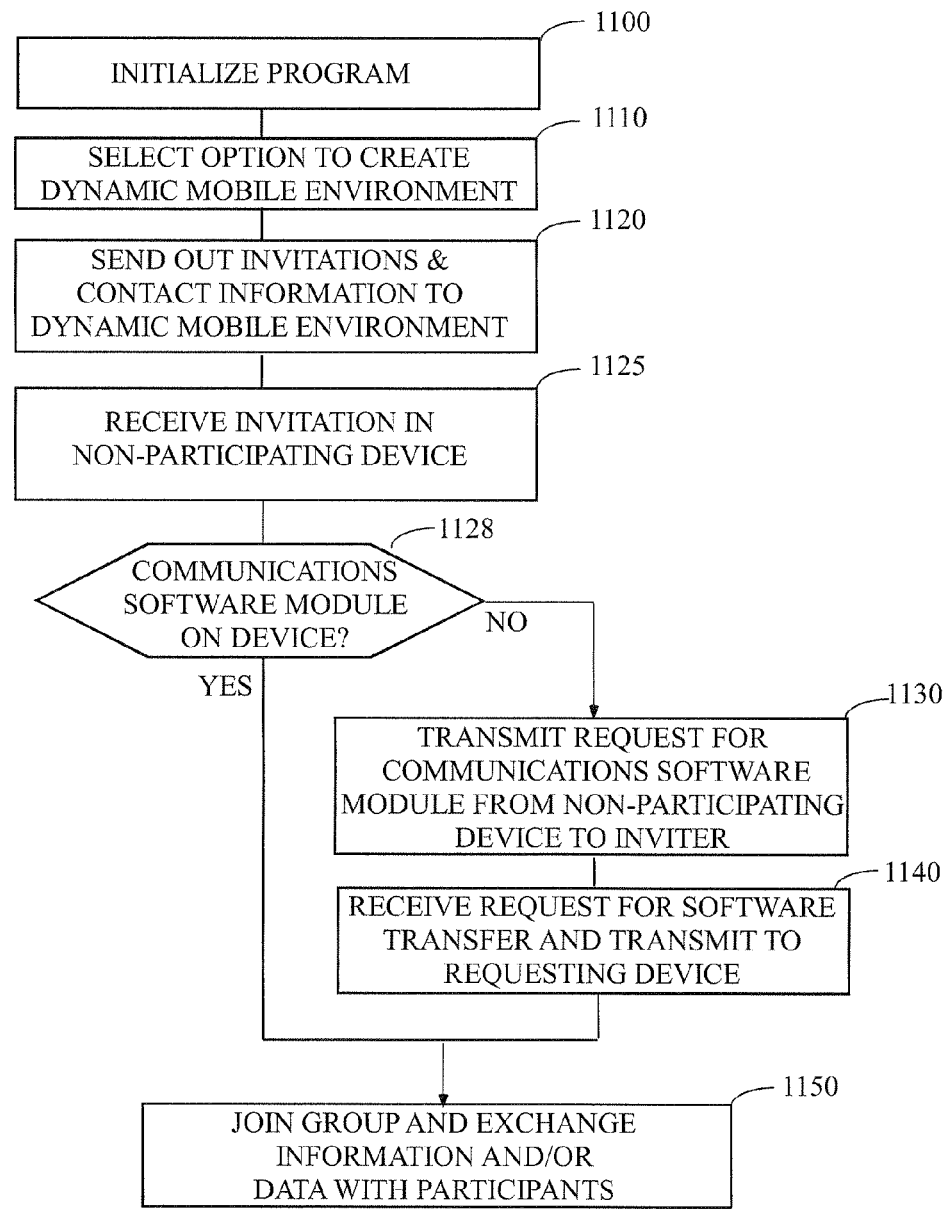
FIG. 11 contains a flowchart that illustrates some preferred logic steps suitable for use on the initiators side of the instant invention.

FIG. 11 illustrates a preferred workflow of the instant invention which would be suitable for a user who wishes to initiate a multi-user communication group. As a first preferred step 1100, the program will be started and initialized according to methods well known to those of ordinary skill in the art. As has been discussed previously, the program will preferably be executed on a mobile device with Bluetooth communication capability or support for Wi-Fi technology. As a next preferred step, the user will select the menu option which will initiate the creation of a dynamic mobile environment 1110. Next the instant invention will automatically send out invitations 1120 to others in the vicinity to join into the dynamic mobile environment and accompanying these invitations will be the contact information data that makes it possible for new participants to join the group. As a next preferred step, the process of creating the multi-user group preferably follows one of two paths. One reason for dividing the program logic into two separate paths is to differentiate between the situations where the joining mobile device already has the necessary software from those cases where it does not. The workflow process associated with the processes on the mobile devices of potential participants will be explained in more detail in FIG. 12.

Returning to FIG. 11, in the event that the mobile device of a potential participant does not contain the necessary software, that device will send a request for same back to the cell phone or other mobile device of the initiating party. That is, the mobile device of the initiating user will receive one or more requests for copies of the communications software module from each potential participant 1130. In a next preferred step, the instant invention will transmit the requested communications software module to the joining participants according to the received request 1140. After the instant invention has completed its software transmission, the transmitted program will be activated on the receiving device and the receiving parties will be able to join (and, preferably will automatically join) the communication group. In the case that the potential participants already possess the necessary software, the workflow process on the mobile device of the initiating user moves from the step of sending out invitations plus the contact information 1120 to the step of exchanging information/data with joined participants 1150.

Figure 12:
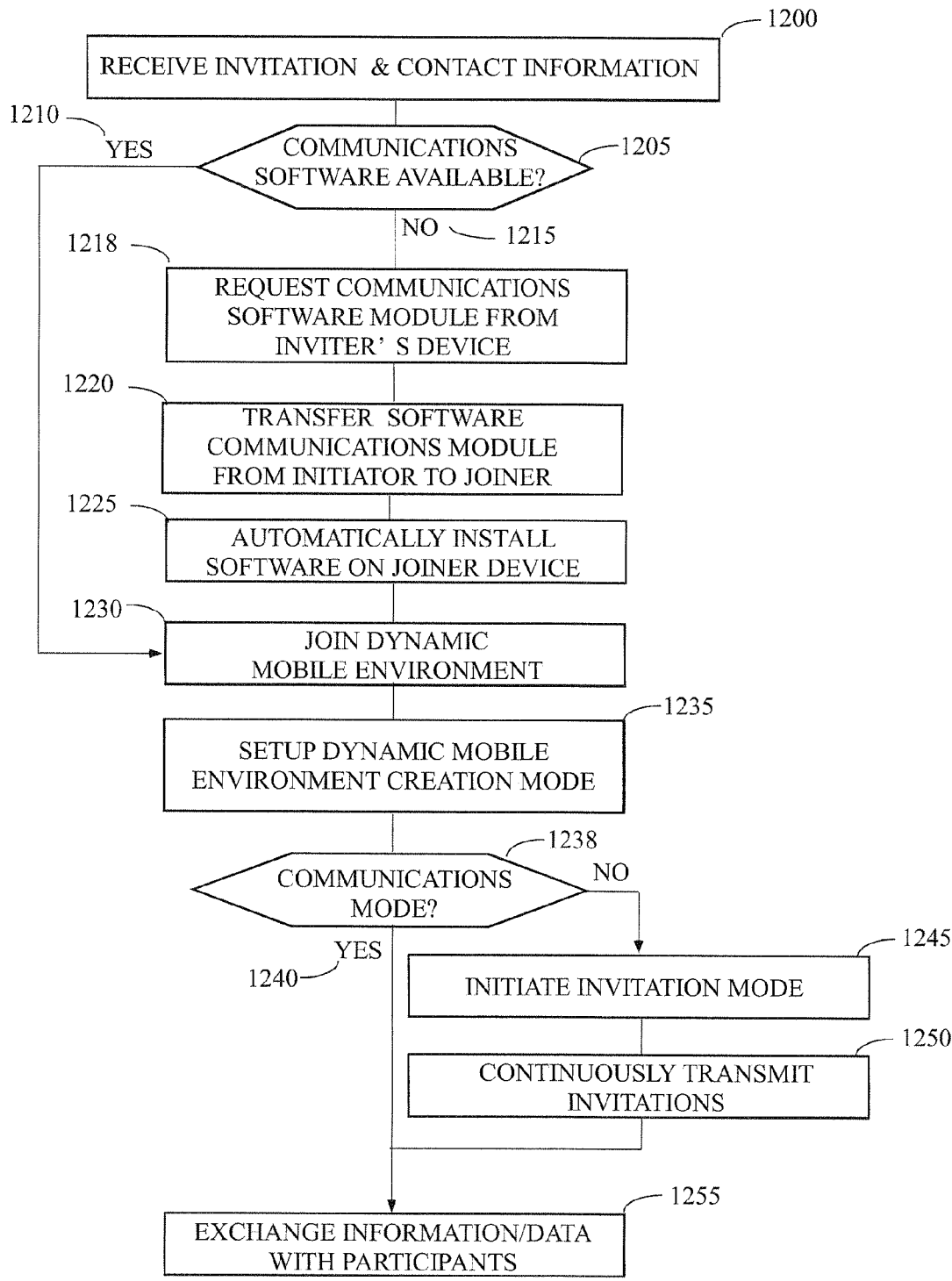
FIG. 12 contains a flowchart which illustrates some preferred steps necessary to implement the instant invention on the participant's side.

Turning next to FIG. 12, this figure illustrates a preferred operating logic that would be suitable for use on the mobile device of a potential participant. As a first preferred step, the instant invention will preferably begin with the broadcast of a signal from a group originator (or another member of the group) which extends an invitation to join. Along with or as part of the invitation, and has been described previously, contact information which is sufficient to allow the recipient's device to reply will also be transmitted. The invitation will be received by a potential group member's communications device (step 1200) and, preferably after determining whether or not the recipient wishes to join the group, a determination will be made as to whether or not the necessary communications software is resident on the recipient's device (step 1205). If the result of the scan of the recipient's device returns a positive outcome 1210 (i.e., if the necessary communications software is already present), the mobile device of the potential participant will then join the group 1230 by using the contact information received via the invitation.

If the result of the scan returns a negative outcome 1215, i.e. if the software is not available on this device, the instant invention will preferably send out a signal (step 1218) that requests a copy of the communications software module from the mobile device of the user who transmitted the invitation. Upon receipt of such a request from a prospective participant, the software necessary to establish a connection to the dynamic mobile environment will preferably be automatically transferred to the mobile device from the initiator (step 1220). As a next preferred step 1225, the communications software will automatically be installed on the receiving mobile device. As a next preferred step 1230, the mobile device of the recipient preferably will automatically execute the program that was just received, thereby joining the dynamic mobile environment. The installation and joining steps will preferably be carried out without any visible notification to the user, thereby simplifying and accelerating the effort to connect to a group.

Next, preferably a configuration step 1235 will be performed. This step will preferably include initiation of the mobile environment creation mode 1235, wherein this step preferably at least defines how the mobile device will behave in a dynamic mobile environment with respect to an increase in the size of the communication group.

By way of explanation, it should be noted that the instant invention preferably features two distinct operating modes that are useful in connection with the creation of the mobile environment. Depending on the mode (step 1205), the functionality will preferably be different. A first such mode is the invitation mode 1245, wherein the mobile device continuously transmits invitations 1250 which are receivable within the connection area of that mobile device, the purpose of such invitations being to make other users aware of the existence of the group and provide a means for them to join in. A second preferred mode will be referred to as the communication mode 1240/1255. In this mode the mobile device will not send out invitations to potential participants, but instead it handles the communications requirements of the group.

If done according to the methods taught herein, the introduction of new devices into the group will not impact the connection and exchange of information between the devices that are already in communication. The new member devices will be immediately virtually connected to the communications environment after the software has been installed on each participant's device or after the instant invention detects that the software is already installed on that mobile device and it initiates a connection. Finally, and as is illustrated in FIG. 12, at the conclusion of the above-described process each user in the group will be able to exchange information/data with each of the others (step 1255) according to the method discussed previously.

Finally, it should be noted and remembered that the invite mode is the default setting on any mobile device that is a member of the multi-user communication group. It is not necessary that the user specify any parameters related to this mode. That being said, it is fully expected by the instant inventors that in some cases a user might be allowed to disable or otherwise modify the invitation mode (e.g., to exclude the inclusion of additional participants) after the group is joined. Such a possibility has been specifically contemplated by the instant inventors.

CONCLUSIONS

Of course, many modifications and extensions could be made to the instant invention by those of ordinary skill in the art. In some preferred embodiments it might be desirable to streamline the connection process to the dynamic mobile environment in such a way that the connection process for a potential participant visually only consists of the reception of the invitation and the display of the graphical user interface displaying the chat functions.

Further, although the instant disclosure has been generally couched in terms of the user of a single communications program that is resident on each mobile communications device that is designed to provide all of the functionality of the instant invention, those of ordinary skill in the art will recognize that in some instances it might be desirable to utilize multiple programs, each of which handles some part of the functionality. As such, when the terms "program" or "module" are used herein, such should be understood in both instances where a single program handles all aspects of the instant invention, as well as those cases where multiple programs cooperate to implement different aspects of the instant invention.

Still further, for purposes of the instant disclosure it should be understood that in those cases where the communications software is present on an invitee's device but its revision/version number is such that it is incompatible with (or will operate imperfectly with) the software utilized by the group, that case will preferably be treated as though the software were not present at all on the invitee's device and it will be resent from the initiator's device with the intent of replacing or otherwise updating the software on the invitee's device.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those skilled in the art, without departing from the spirit of the inventive concept the scope of which is to be determined by the following claims.

What is claimed is:

1. A method of local text communication between a plurality of mobile communications devices, comprising the steps of:
   (a) broadcasting via Bluetooth an electronic invitation from a first mobile communication device,
      wherein said electronic invitation comprises at least a group ID, and
      wherein said first mobile communications device has a group communications program stored therein;
   (b) receiving via Bluetooth a representation of said electronic invitation within a second mobile communications device proximate to said first mobile communications device;
   (c) determining whether said second mobile communications device will enter into a communications group along with at least said first mobile communications device;
   (d) if it is determined that said second mobile communications device will enter said communications group,
      (d1) forming a communications group with comprising at least said first and second mobile communications devices, said communications group being identified by said group ID;
      (d2) determining whether said group communications program is resident within said second mobile communications device,
      (d3) if said group communications program is not resident within said second mobile communications device,
         (i) transmitting via Bluetooth a request for said group communications program to at least said first mobile communications device,
         (ii) receiving via Bluetooth said transmitted request for said group communications program at least within said first mobile communications device,
         (iii) transmitting via Bluetooth from said first mobile communications device said group communications program,
         (iv) receiving via Bluetooth within said second mobile communications device said transmitted group communications program,
         (v) installing said group communications program within said second mobile communications device, and,
         (vi) executing said group communications program within said second mobile communications device, thereby joining said second mobile communications device to said communications group;
   (e) if it is determined that said group communications program is resident within said second mobile communications device, executing said group communications program within said second mobile communications device, thereby joining said second mobile communications device to said communications group; and,
   (f) using at least said group communications program and said group ID to establish a Bluetooth connection between the mobile communication devices and to transmit an item of text from a selected one of said mobile communications devices in said communications group to every other mobile communications devices in said communications group.

2. The method according to claim 1, further comprising:
   (g) repeatedly broadcasting said electronic invitation via Bluetooth at a predetermined time interval from at least one of said mobile communications devices in said communications group;
   (h) bringing a third mobile communications device proximate to at least one of said mobile communications devices in said communications group;

(i) receiving via Bluetooth a representation of said electronic invitation within said third mobile communications device;

(j) determining whether said third mobile communications device will enter into said communications group along with at least said first mobile communications device; and, (k) if it is determined that said third mobile communications device will enter into said communications group, adding said third mobile communications device to said communications group by performing at least steps (d) and (e).

3. The method according to claim 1, further comprising:

(g) receiving said item of text within each of said other mobile communications devices in said communications group; and, (h) reading of said item of text via each of said other mobile communications devices in said communications group by a plurality of users.

4. A method according to claim 1, wherein step (f) comprises the steps of:

(f1) obtaining an item of text, (f2) compressing said item of text, thereby producing a compressed item of text, (f3) using at least said group communications program and said group ID to transmit said compressed item of text from one of said mobile communications devices in said communications group to each of said other mobile communications devices in said communications group and, (f4) within each of said other mobile communications devices in said communications group decompressing said compressed item of text.

5. The method according to claim 1, further comprising:

(g) receiving said item of text within another mobile communications device;

(h) using said group ID to determine if said another mobile communications device is in said communications group;

(i) displaying said item of text on said another mobile communications device only if said another mobile communications device is determined to be in said communications group; and, (j) reading by a user of said item of text.

6. The method according to claim 1, wherein said first mobile communication device is selected from a group consisting of a cell phone, PDA, handheld, notebook, and a portable music player.

7. The method according to claim 1, wherein
said first mobile communications device has a first user ID associated therewith,
said electronic invitation comprises at least said first user ID and said group ID, and,
said second mobile communications device has a second user ID associated therewith, and,
wherein claim 1 further comprises the step of:

(g) using at least said group communications program, said group ID, said first user ID, and said second user ID to transmit an item of text from said first mobile communications device to only said second mobile communications device.

* * * * *